US008527910B2

(12) United States Patent
Jeong

(10) Patent No.: US 8,527,910 B2
(45) Date of Patent: Sep. 3, 2013

(54) METHOD AND DISPLAY APPARATUS OF PROVIDING ADVANCE SCREEN SAVER WARNING

(75) Inventor: Seok Hwa Jeong, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 1156 days.

(21) Appl. No.: 10/747,949

(22) Filed: Dec. 31, 2003

(65) Prior Publication Data

US 2004/0150678 A1 Aug. 5, 2004

(30) Foreign Application Priority Data

Jan. 15, 2003 (KR) ........................ 10-2003-0002712

(51) Int. Cl.
*G06F 3/048* (2006.01)

(52) U.S. Cl.
USPC .......................................................... 715/867

(58) Field of Classification Search
USPC ........................................... 715/867; 710/18
See application file for complete search history.

(56) References Cited

U.S. PATENT DOCUMENTS 5,153,580 A * 10/1992 Pollack .................... 340/825.25
5,442,600 A * 8/1995 Kutosky ........................ 368/109
6,034,652 A * 3/2000 Freiberger et al. ............ 715/730
6,076,169 A 6/2000 Lee
6,192,388 B1 2/2001 Cajolet
6,282,655 B1 * 8/2001 Given ............................. 726/34
6,286,106 B1 * 9/2001 Flannery ....................... 713/310
6,313,878 B1 * 11/2001 Jankowiak .................... 348/377
6,353,449 B1 3/2002 Gregg et al.
6,374,145 B1 * 4/2002 Lignoul .......................... 700/17
6,384,853 B1 * 5/2002 Shaffer et al. ................. 715/867
6,559,838 B1 * 5/2003 Lonoce et al. ................ 345/212
6,590,597 B1 * 7/2003 Kim .............................. 715/866
6,683,605 B1 * 1/2004 Bi et al. ........................ 345/211

(Continued)

FOREIGN PATENT DOCUMENTS

CN 2406037 Y 11/2000
JP 10-161622 A 6/1998

(Continued)

OTHER PUBLICATIONS

Halfbakery: Screensaver Countdown Aug. 16, 2004, [online], [retrieved on Jan. 31, 2007] Retrieved using Internet <URL: http://www.halfbakery.com/idea/Screensaver_20Countdown>.*

(Continued)

*Primary Examiner* — Stephen Alvesteffer
(74) *Attorney, Agent, or Firm* — Birch, Stewart, Kolasch & Birch, LLP

(57) ABSTRACT

A method and display apparatus of providing an advance screen saver warning is disclosed. The display apparatus includes a parameter set unit, a counter, and a controller. The parameter set unit initially predetermines a screen saver standby time and an advance screen saver warning time, and the counter counts a current system idle time during which no system input activity is detected. Then the controller activates an advance screen saver warning before activating a screen saver if the current system idle time is greater than or equal to a time difference between the screen saver standby time and the advance screen saver warning time, where the advance warning may be in the form of a warning window displayed on a display screen or a warning sound outputted through a speaker.

14 Claims, 7 Drawing Sheets

(56) References Cited

U.S. PATENT DOCUMENTS

| | | | | |
|---|---|---|---|---|
| 6,799,209 | B1 * | 9/2004 | Hayton | 709/223 |
| 6,812,938 | B2 * | 11/2004 | Pinnell | 715/741 |
| 6,891,564 | B2 * | 5/2005 | Fujimori et al. | 348/173 |
| 7,110,995 | B2 * | 9/2006 | Kirkland | 707/3 |
| 2003/0191960 | A1 * | 10/2003 | Hung-yi | 713/200 |
| 2004/0075700 | A1 * | 4/2004 | Liu et al. | 345/867 |

FOREIGN PATENT DOCUMENTS

| | | | |
|---|---|---|---|
| JP | 11-231850 | A | 8/1999 |
| JP | 11251850 | A | 9/1999 |
| KR | 10-2002-0024698 | A | 4/2002 |
| TW | 481769 | | 4/2002 |
| WO | WO-02/23295 | A1 | 3/2002 |

OTHER PUBLICATIONS

Sanyo Multimedia Projector PLV-70 Owner's Manual. Retrieved Nov. 4, 2009 from <http://www.projectorcentral.com/pdf/projector_manual_1730.pdf>. Published Aug. 2002, <http://www.projectorcentral.com/Sanyo-PLV-70.htm?print=1>.*

"Hardware monitor security feature" IBM Technical Disclosure Bulletin, IBM Corp. New York, US, vol. 32, No. 3A, Aug. 1, 1989, p. 284/285, XP000049463.

"Experiencing the Basic Installation of Windows 98", www.chudoo.com, Nov. 4, 2002, F08 page.

* cited by examiner

METHOD AND DISPLAY APPARATUS OF PROVIDING ADVANCE SCREEN SAVER WARNING

CROSS-REFERENCE TO RELATED APPLICATIONS

This application claims the benefit of Korean Application No. P2003-02712, filed on Jan. 15, 2003, which is hereby incorporated by reference as if fully set forth herein.

BACKGROUND OF THE INVENTION

1. Field of the Invention

The present invention relates to a screen saver for a display device, and more particularly, to a display apparatus and method for providing an advance screen saver warning before activating a screen saver.

2. Discussion of the Related Art

In general, a screen saver for a computer display system is a function that runs by computer programs, routines or symbolic languages for saving electric power and for protecting a display monitor from being damaged. When no user input has been received through the keyboard or mouse of the display system for a predetermined length of time, a screen saver may be automatically activated. The operation parameters related to the screen saver (e.g., the time for activating the screen saver) are often set by a user.

One of the main objectives of the screen saver for a display device is to protect the display monitor (screen) of the display system. For example, when an original user does not use the computer display system such that a same image is displayed on the display monitor for a long time, burning of a fixed pattern onto the phosphor monitor screen may occur. This problem may be resolved by activating a screen saver when the display system is idle (no input activity) for a specified amount of time in order to avoid such burning of the fixed pattern on the screen. The screen saver will display moving images that will prevent damage to the screen.

Another objective of the screen saver is to limit access to the computer system by an unauthorized person when the original user is not in the vicinity of the computer display system. Deactivation of a screen saver activated due to no input activity (screen activity) often requires an authentication process, in which an authentication code such as a password may be required. Therefore, those who do not have the password may not be able to access to the system, and thereby, the data stored in the system can be securely protected.

The prior screen saver systems typically monitor the synchronization signal (vertical or horizontal) in order to determine the input activity of the systems. If there is no input activity for a predetermined length of time, a screen saver will be activated automatically without displaying Any sort of advance notice on the screen. Once the screen saver is activated, the system user may need to enter a password or must go through a complicated authentication process in order to access to the system. This may cause a great deal of inconvenience to the user, especially when the user is in the vicinity of the system but there is no user input activity. Therefore, a screen saver system able to provide an advance notice before the screen saver activation is desired.

SUMMARY OF THE INVENTION

Accordingly, the present invention is directed to a display apparatus and method for providing an advance screen saver warning that substantially obviates one or more problems due to limitations and disadvantages of the related art.

An object of the present invention is to provide a method and display apparatus that is able to provide an advance screen saver warning before a screen saver is activated so that an operator does not have to go through a complicated authentication process in order to access to the system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of providing an advance screen saver warning for a display system includes the step of predetermining a screen saver standby time and an advance screen saver warning time. The screen save standby time represents a total length of system idle time that must elapse before activating a screen saver, and the advance screen saver warning time is a length of time during which the advance screen warning is continuously activated before activating the screen saver. The method further includes the steps of counting a current system idle time during which no system input activity is detected, and activating an advance screen saver warning before activating the screen saver if the current idle time is greater than or equal to a time difference between the screen saver standby time and the advance screen saver warning time.

The step of activating an advance screen saver warning may include the step of displaying a warning message window on a display screen, which indicates a time remaining until the screen saver is activated. The remaining time may be calculated by subtracting the current system idle time from the screen saver standby time, and the warning message window may include at least one of a textual representation and a graphical representation indicating the remaining time. Alternatively, the step of activating an advance screen saver warning may include the step of outputting a predefined warning sound through a speaker, where the warning sound may be any one of a computer-generated sound and a human voice indicating a time remaining until the screen saver is activated.

In another aspect of the present invention, a display apparatus of providing an advance screen saver warning may include a parameter set unit predetermining a screen saver standby time and an advance screen saver warning time, a counter counting a current system idle time during which no system input activity is detected, and a controller coupled to the parameter set unit and the counter for activating an advance screen waver warning before activating a screen saver if the current system idle time is greater than or equal to a time difference between the screen saver standby time and the advance screen saver warning time.

The apparatus may further include a message window generator coupled to the controller for generating an image signal representative of a warning message window indicating a time remaining until the controller activates the screen saver, and a display screen coupled to the message window generator for displaying the warning message window. The warning message window may include at least one of a textual representation and a graphical representation indicating the remaining time. Alternatively, the apparatus may further include a speaker coupled to the controller for outputting a predefined warning sound, which may be any one of a computer-generated sound such as a beep sound and a human voice indicating a time remaining until the controller activates the screen saver.

The apparatus may further include a sync detector coupled to the controller for detecting a sync signal, and a key input unit also coupled to the controller for receiving a manual user input from an operator, where the system input activity includes at least one of the sync signal and the manual user input.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
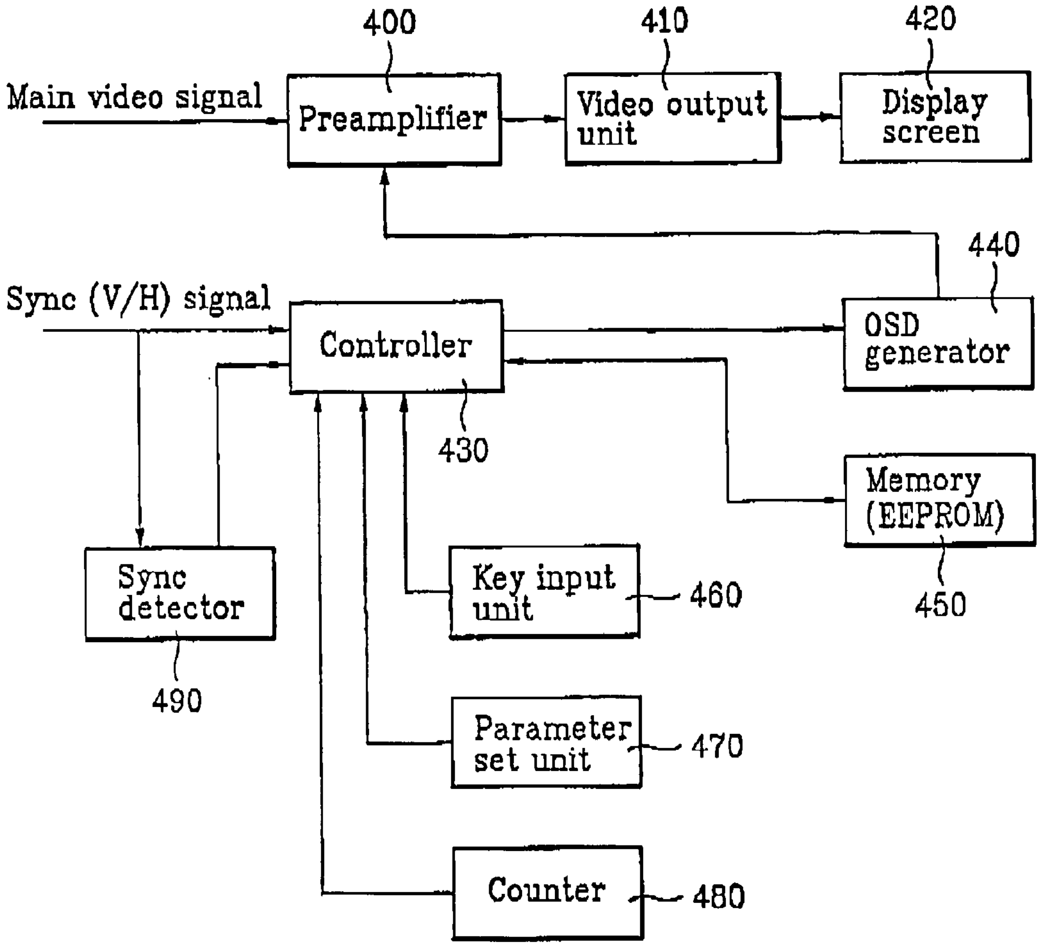
FIG. 1 illustrates a display apparatus of providing an advance warning of upcoming screen saver activation according to the present invention.

FIG. 1 illustrates a display apparatus of providing an advance warning of upcoming screen saver activation according to the present invention. Referring to FIG. 1, the display apparatus includes a preamplifier 400, a video output unit 410, a display screen 420, a controller 430, an on screen display (OSD) generator 440, a memory 450, a key input unit 460, a parameter set unit 470, a counter 480, and a vertical or horizontal synchronization signal detector 490.

The preamplifier 400 amplifies a main video signal (e.g., R, G, and B signals) received from an external video source (not illustrated) and an OSD image signal received from the OSD generator 440 to a predetermined level. Then the video output unit 410 further amplifies the preamplified main video signal and/or OSD image signal and displays them on the display screen 420.

A screen saver standby time (Tx) and a screen saver advance warning time (Ty) may be preset by the parameter set unit 470, an example of which is a screen saver display properties window in a windows operating system (OS). Both of Tx and Ty may be preset to default values that are assigned automatically by the parameter set unit 470 or controller 430, and these default values remain in effect unless canceled or overridden. Alternatively, a user may manually preset Tx and Ty using the key input unit 460 (e.g., a keyboard or mouse). When manually selected, the default values do not remain in effect any longer unless the manually selected values are canceled. The default values and the values manually selected by the user may be stored in the memory 450, an example of which is an Electrically Erasable Programmable Read-only Memory (EEPROM). The screen saver standby time (Tx) represents a total length of system idle time (e.g., no sync detection or user input period) that must elapse before a screen saver is activated or displayed. The screen saver advance warning time (Ty) represents a predetermined length of time before a screen saver is activated, during which an advance warning of upcoming screen saver activation is continuously provided unless canceled by a user.

The advance warning may be in the form of a visual warning message window displayed on the display screen 420, which may indicate the time remaining until a screen saver is activated. The warning message window may include at least one of a textual representation and a graphical representation indicating such remaining time. Alternatively, the advance warning may be in the form of specified sound, which may be outputted through a speaker (not illustrated) during Ty. The specified sound may include at least one of a human voice and a computer-generated sound such as a beep sound indicating such remaining time.

The controller 430, which may be a microprocessor, keeps monitoring the horizontal and/or vertical synchronization signal via the sync detector 490 or monitors the key input unit 460 for determining input activity of the display apparatus. When the controller 430 determines no system input activity, it sends a command to the counter 480 to start count a current system idle time during which no system input activity is detected. Then the controller 430 activates an advance screen saver warning before activating a screen saver if the current system idle time is greater than or equal to a time difference between Tx and Ty. In other words, it generates a first control signal to the OSD generator 440 for displaying a warning message window on the display screen 420, or it generates a second control signal to the speaker for generating a warning sound. Next, it generates control signals to activate a screen saver if the current system idle time is greater than or equal to Tx.

Referring back to FIG. 1, the sync detector 490 determines whether a horizontal sync signal or a vertical sync signal is received from an external sync signal source (not illustrated) and sends the result of the determination to the controller 430, which then performs an advance warning based on this result. The OSD generator 440, upon receiving a control signal from the controller 430, generates an image signal representative of an advance screen saver warning OSD window in order to display the warning window on a predetermined portion of the display screen 420.

The key input unit 460 shown in FIG. 1 determines whether a user input is received from an operator while the advance screen saver warning is being activated and sends the result of the determination to the controller 430, which performs an advance warning based on this result.

Figure 2:
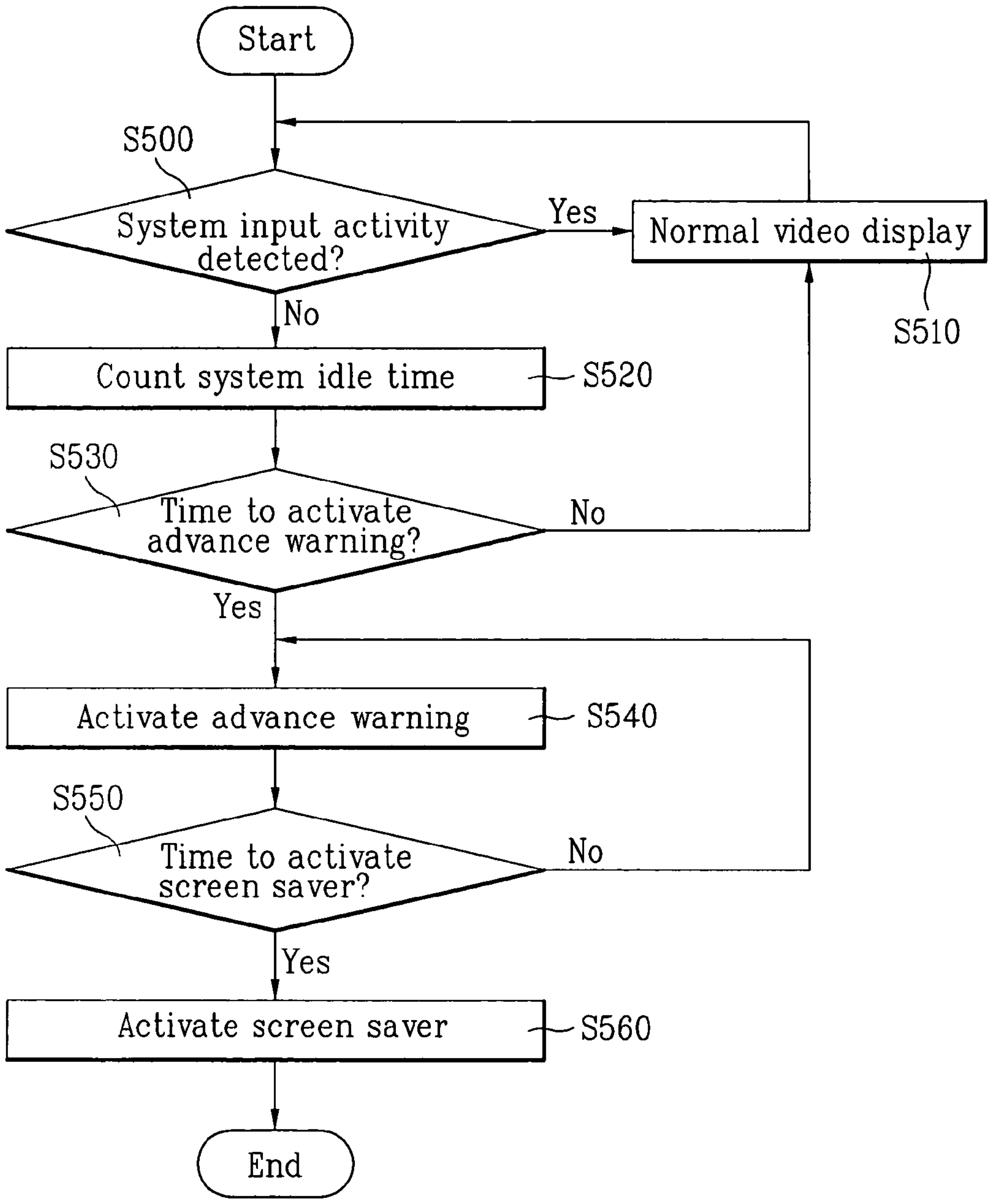
FIG. 2 illustrates a method of providing an advance warning of upcoming screen saver activation according to the present invention.

Reference will now be made in detail to a method for providing an advance warning of upcoming screen saver activation according to the present invention, an example of which is illustrated in FIG. 2.

Referring to FIG. 2, the controller 430 initially determines whether any system input activity is detected (S500). One way of detecting such system input activity is to determine whether a horizontal or vertical synchronization signal from a sync signal source is detected via the sync detector 490. Another example is to monitor whether there is any user input made through the key input unit 460 such as a keyboard or a mouse. If it is determined in step S500 that any system input activity is detected, the controller 430 performs normal video display by generating control signals so as to display a main video signal (e.g., R, G, and B signals) received from an external video source on the display screen 420 (S510). On the other hand, if the controller 430 determines no system input activity in step S500, it sends a command to the counter 480 to start counting a system idle time (input-inactivity time) (S520). The system idle time represents a length of time during which no system input activity is detected. The system input activity includes at least one of a vertical or horizontal synchronization signal which may be detected by the sync detector 490, and a manual user input which may be entered through the key input unit 460.

Next, the controller 430 determines whether it is time to provide an advance screen saver warning by determining whether the current system idle time being counted by the counter 480 is greater than or equal to a time difference between the screen saver standby time (Tx) and the screen saver advance warning time (Ty) (S530). As explained earlier, Tx represents a total length of system idle time that must elapse before a screen saver is activated or displayed, and Ty represents a predetermined length of time before a screen saver is activated, during which an advance screen saver warning is continuously activated. If the current system idle time is determined to be greater than or equal to the time difference between Tx and Ty in step S530, the controller 430 generates control signals to activate an advance screen saver warning before activating a screen saver (S540).

The advance warning activated by the controller 430 in step S540 may be deactivated at any time during Ty when any system input activity is detected (e.g., a user input entered by an operator through the key input unit 460). In step S540, the controller 430 may activate an advance warning by generating a first control signal to the OSD generator 440 for displaying an OSD warning message window on the display screen 420, or by generating a second control signal to the speaker of the display system for generating a warning sound. On the other hand, if the current system idle time is determined to be less than the time difference in step S530, the controller 430 performs normal video display as it was done in step S510.

After performing step S540, the controller 430 further determines whether it is time to activate a screen saver by determining whether the current system idle time being counted by the counter 480 is greater than or equal to the screen saver standby time Tx (S550). If it is, the controller 430 generates control signals to deactivate the advance screen saver warning and to simultaneously activate a screen saver (S560). Otherwise, it performs normal video display and repeats the steps beginning from S540.

Figure 3:
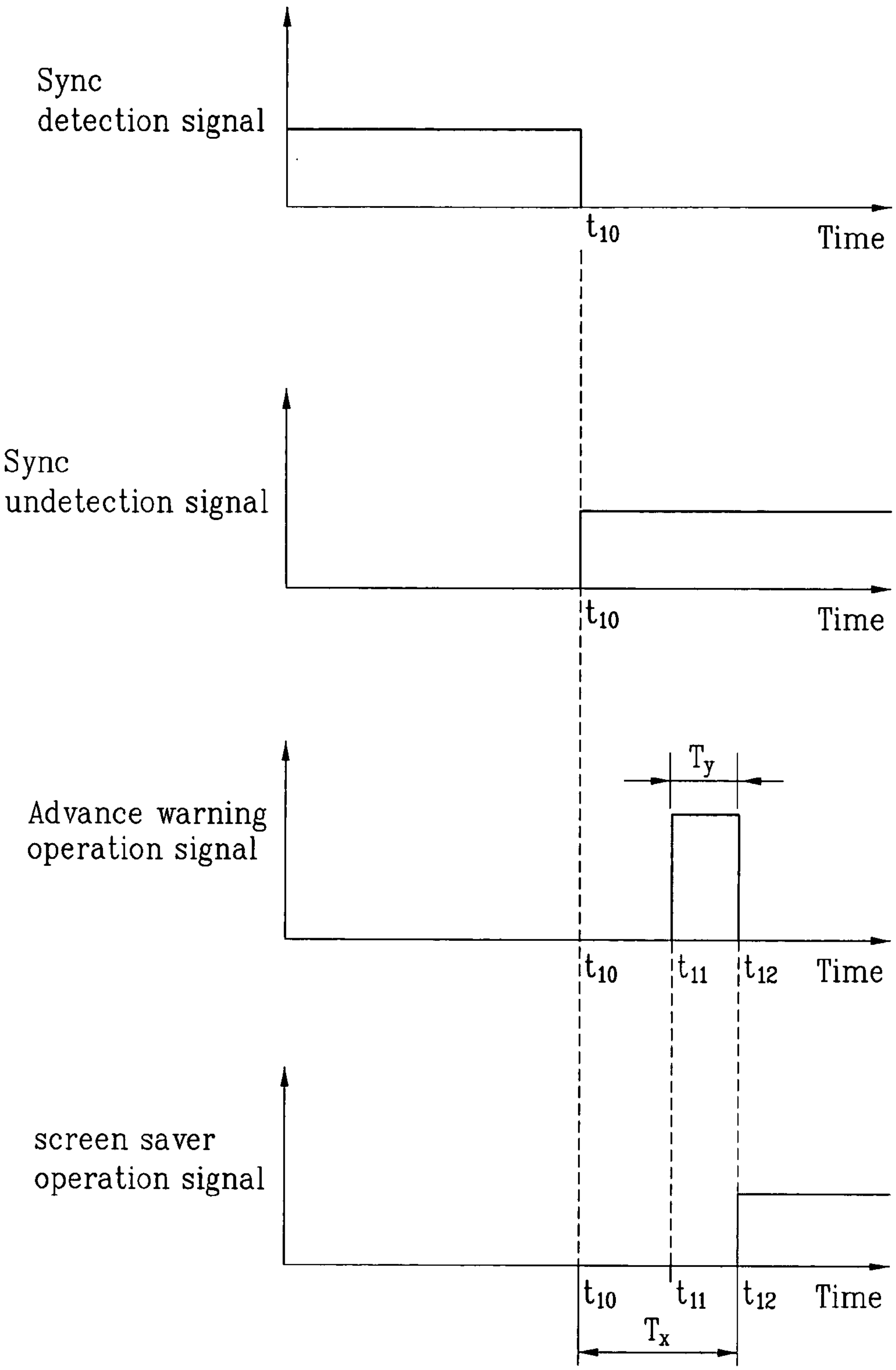
FIG. 3 illustrates how an advance screen saver warning is provided in time before a screen saver is activated.

FIG. 3 is an example illustrating how the controller 430 of the display apparatus shown in FIG. 1 activates an advance screen saver warning and a screen saver in time based on Tx, Ty, and the current system idle time. A sync signal (horizontal or vertical) is continuously received and detected by the sync detector 490 or the controller 430 during the period of $0<\text{time}<t_{10}$. During this period, the level of a sync detection signal (system input activity signal) is HIGH and the level of a sync undetection signal (system input inactivity signal) is LOW. When the sync detector 49 or the controller 430 stop detecting any sync signal at time=$t_{10}$, the level of the sync detection signal becomes LOW and that of the sync undetection signal becomes HIGH. At this time, the controller 430 sends a command to the counter 480 to start counting a system idle time.

After time=$t_{10}$, the controller 430 starts to determine whether it is time to activate an advance screen saver warning. When time=$t_{11}$, the current system idle time is equal to a time difference between Tx and Ty. Therefore, the level an advance warning operation signal becomes HIGH in order to activate an advance screen saver warning. When time=$t_{12}$, the system idle time being counted by the counter 480 is equal to Tx. Therefore, the level of the advance warning operating signal becomes LOW to deactivate the advance warning (if not canceled by an operator) and the level of a screen saver operation signal becomes HIGH in order to activate a screen saver.

Figure 4:
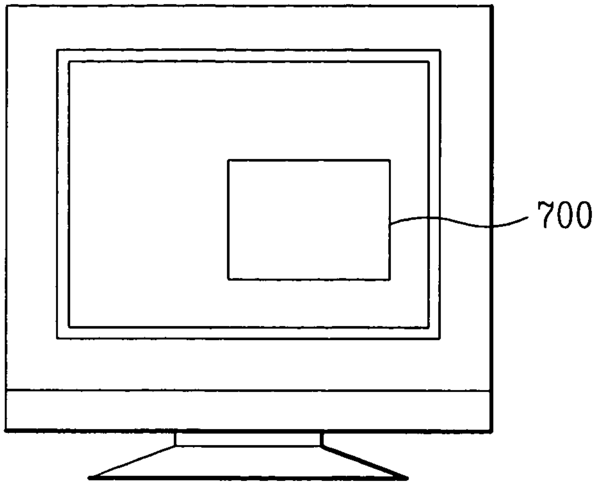
FIG. 4 illustrates an example of a warning message window displayed on the display screen 420.

FIG. 4 illustrates a warning message window 700 which may be displayed on the display screen 420. As it is shown in the figure, the window 700 may be displayed on a predetermined portion on the display screen 420. This screen portion is usually preset by the controller 430 or parameter input unit 470 by default, but it can be changed by a user.

Figure 5A:
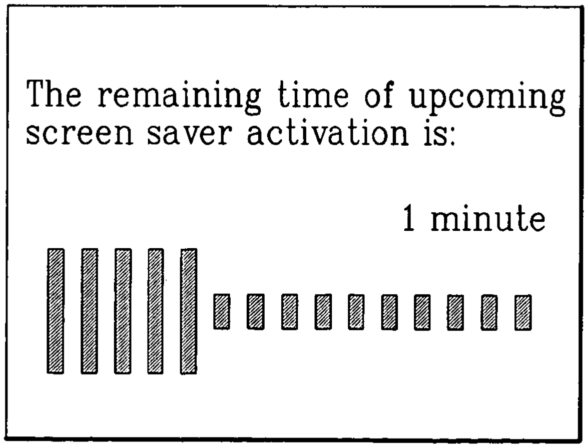
FIGS. 5A to 5F illustrate several examples of the warning message window 700 shown in FIG. 4.
Figure 5B:
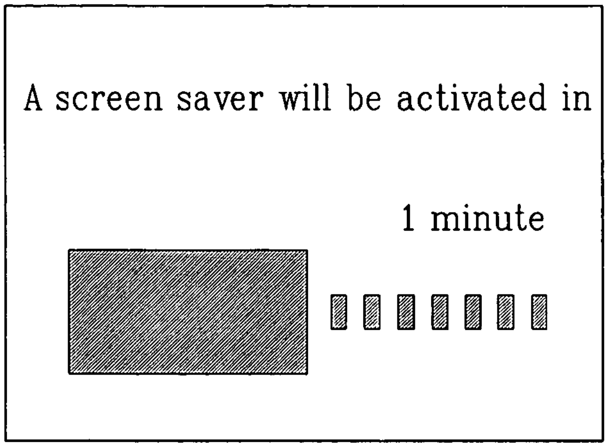
Figure 5C:
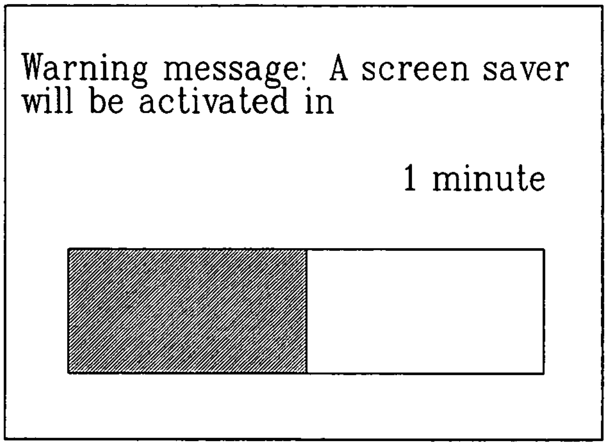
Figure 5D:
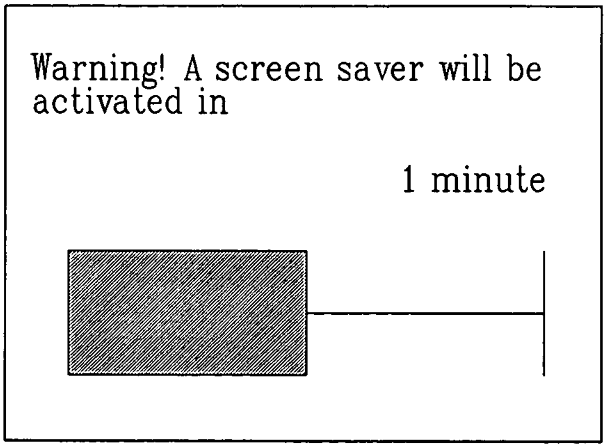
Figure 5E:
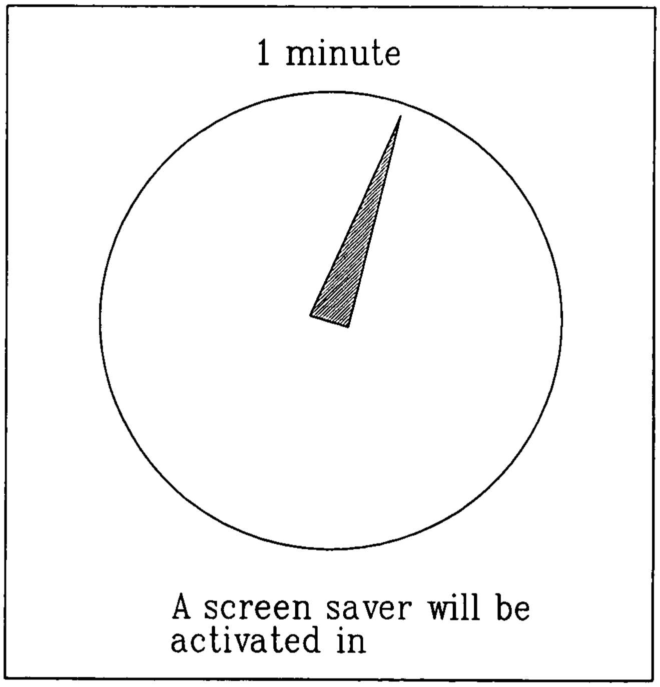
Figure 5F:
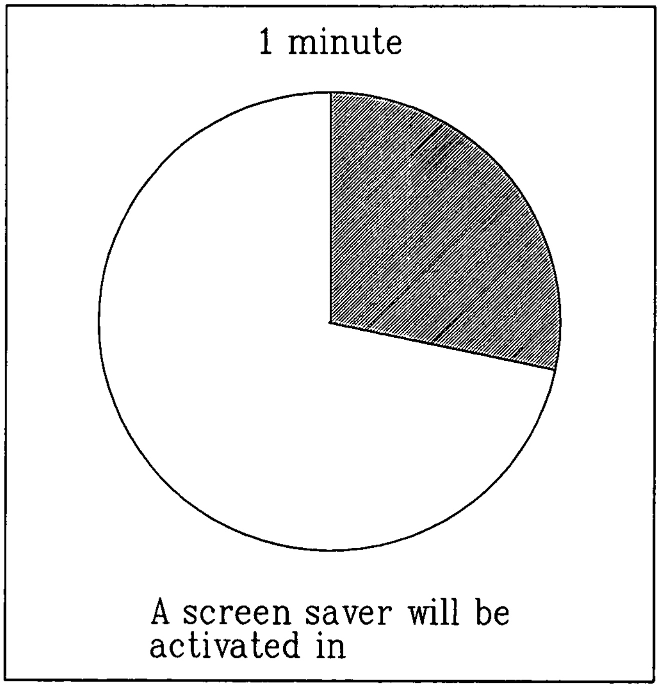

FIGS. 5A to 5F illustrate several examples of the warning message window 700 shown in FIG. 4. The warning message window 700 may indicate the time remaining until a screen saver is activated, and this remaining time may be obtained by the controller 430 by subtracting the current system idle time from the screen saver standby time Tx. The warning message window 700 may include at least one of a textual representation and a graphical representation indicating the remaining time. For example, the warning message window 700 may include a textual representation described as "The remaining time of upcoming screen saver activation is 1 minute" or "A screen saver will be activated in 1 min". The warning message window 700 may further include a bar-type graph indicating the remaining time of upcoming screen saver activation as shown in FIG*s*. 5A to 5D. Alternatively, the warning message window 700 may include a clock-type graph with a moving indicator (e.g., needle) indicating the remaining time as shown in FIG. 5E, or it may include a pie-type graph indicating the remaining time as shown in FIG. 5F.

By providing the remaining time of upcoming screen saver activation, a user is able to know when a screen saver will be activated in advance. If the user does not the screen saver to be activated, he or she may simply enter a user input to the display apparatus through the key input unit 460 in order to prevent the screen saver from being activated. In this way, the user does not have to go through a complicated authentication process which may cause a great deal of inconvenience to the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display apparatus for providing an advance screen saver warning, the apparatus comprising:

a parameter set unit configured to predetermine a screen saver standby time and an advance screen saver warning time, wherein the screen saver standby time and the advance screen saver warning time are manually set by a user, and wherein the advance screen saver warning time is less than the screen saver standby time;

a counter configured to count a current system idle time during which no system input activity is detected;

a controller, coupled to the parameter set unit and the counter, configured to activate an advance screen saver warning before activating a screen saver if the current system idle time is greater than or equal to a time difference between the screen saver standby time and the advance screen saver warning time, and configured to continuously execute the activated advance screen saver warning by the display apparatus until a detection of system activity or activation of the screen saver; and a sync detector coupled to the controller configured to detect at least one of a horizontal synchronization signal and a vertical synchronization signal, wherein the system input activity comprises receiving the at least one of horizontal and vertical synchronization signals by the sync detector, wherein the screen saver is activated when the current system idle time is greater than or equal to the screen saver standby time, wherein, during the continuous execution of the advance screen saver warning, the display apparatus is controlled by said controller to output at least one of a specified sound and a visual warning message window indicative of the time difference between the screen saver standby time and the current system idle time, and wherein a level of detection of system activity measured by the sync detector is different before executing the advance screen saver warning than after executing the advance screen saver warning such that a level of detection of system activity before the executing the advance screen saver warning is higher than the level of detection of system activity after the executing the advance screen saver warning detected by the sync detector.

2. The display apparatus of claim 1, wherein the controller further deactivates the advance screen saver warning and simultaneously activates the screen saver when the current system idle time is greater than or equal to the screen saver standby time.

3. The display apparatus of claim 1, wherein the graphical representation included in the visual warning message window is any one of a bar-type graph, a clock-type graph with a moving indicator, and a pie-type graph.

4. The display apparatus of claim 1, wherein the visual warning message window is displayed on a predetermined screen portion of the display screen, the predetermined screen portion being automatically determined by the controller or being manually determined by an operator.

5. The display apparatus of claim 1, wherein the controller sends an interruption signal to the message window generator in order to undisplay the visual warning message window from the display screen when any system input activity is detected.

6. The display apparatus of claim 1, wherein the controller activates the screen saver and simultaneously sends an interruption signal to the message window generator in order to undisplay the visual warning message window when the current system idle time being counted by the counter is greater than or equal to the screen saver standby time.

7. The display apparatus of claim 1, wherein the message window generator is an on-screen-display (OSD) window generator, and the visual warning message window is an OSD window.

8. The display apparatus of claim 1, further comprising a speaker coupled to the controller for outputting the specified sound, wherein the specified sound is any one of a computer-generated sound and a human voice indicating a time remaining until the controller activates the screen saver.

9. The display apparatus of claim 1, wherein the screen saver standby time predetermined by the parameter set unit is a total length of system idle time that must elapse before the controller activates the screen saver.

10. The display apparatus of claim 1, wherein the advance screen saver warning time is a length of time during which the controller continuously activates the advance screen saver warning before activating the screen saver.

11. The display apparatus of claim 1, further comprising a key input unit coupled to the controller for receiving a manual user input from an operator, wherein the system input activity comprises the manual user input.

12. The display apparatus of claim 11, wherein the key input unit is any one of a keyboard, mouse, and a pre-selected voice command.

13. The display apparatus of claim 1, further comprising a memory coupled to the controller for storing the predetermined screen saver standby time and advance screen saver warning time.

14. The display apparatus of claim 13, wherein the memory is an Electrically Erasable Programmable Read-only Memory (EEPROM).

* * * * *